United States Patent [19]

Storgard

[11] 4,287,908
[45] Sep. 8, 1981

[54] FUEL TANK SELECTOR VALVE

[75] Inventor: David N. Storgard, Brecksville, Ohio

[73] Assignee: Dana Corporation, Cleveland, Ohio

[21] Appl. No.: 173,448

[22] Filed: Jul. 30, 1980

[51] Int. Cl.³ .............................................. F16K 11/16
[52] U.S. Cl. .................................. 137/255; 137/563; 137/597; 137/636.1; 180/314
[58] Field of Search ................ 60/486; 137/255, 563, 137/597, 636.1; 180/314; 244/135 R, 135 C; 280/5 A

[56] References Cited

U.S. PATENT DOCUMENTS

| | | | |
|---|---|---|---|
| 1,238,073 | 8/1917 | Hollar | 137/255 |
| 2,300,112 | 10/1942 | Ellinwood | 137/636.1 |
| 3,285,272 | 11/1966 | Messenger | 137/563 X |
| 3,288,238 | 11/1966 | Lindsey | 180/314 |
| 3,455,335 | 7/1969 | Pekarek | 137/597 X |

*Primary Examiner*—Robert G. Nilson
*Attorney, Agent, or Firm*—Pearne, Gordon, Sessions, McCoy & Granger

[57] ABSTRACT

A valve assembly for selectively connecting either one of a pair of fuel supply tanks through supply and return lines to and from a combustion engine while isolating the other tank from communication both with the selected active tank and with the engine. The valve includes first and second chambers dedicated respectively to supply and return service. Valving elements in the chambers are operated by a selector shaft shiftable between first and second positions corresponding to the first and second tanks. The valve is advantageously ported in a manner which only requires a single supply line and a single return line to and from the engine.

11 Claims, 4 Drawing Figures

FUEL TANK SELECTOR VALVE

BACKGROUND OF THE INVENTION

The invention relates to directional control valves and in particular relates to a valve for selectively connecting alternate fuel supply tanks to a combustion engine.

In automobiles, trucks, and like vehicles propelled by combustion engines, a need for increased fuel carrying capacity has been experienced. Increased capacity can be achieved by installation of an auxiliary or second tank rather than by the substitution of a larger tank for that normally offered by the vehicle manufacturer. Such auxiliary tanks, or in some cases twin tanks, are often preferred or required for a variety of reasons including safety considerations, space limitations in conventional vehicle designs, retrofit installations by dealers and others besides the vehicle manufacturer, and the security offered by a reserve tank. Many constraints and design criteria exist in the specification of a suitable valve for selectively controlling the supply of fuel from multiple tanks. For instance, in certain vehicles the fuel supply circuit includes a return loop for fuel supplied to but not immediately consumed by the engine. The fuel selector valve, then, must include provisions for return of excess fuel to the active tank. Supply and return flow through the valve must be accomplished while keeping the inactive tank isolated from both the engine and the selected tank. The valve should be capable of manual operation, preferably by simple remote actuation. Ideally, the valve design is inexpensive to mass-produce, simple to install, and reliable in operation. In general, prior art devices of the general class under consideration here have been relatively complex and expensive to manufacture.

SUMMARY OF THE INVENTION

The invention comprises a directional control valve for establishing fluid communication between either one of a pair of alternate fuel tanks in a vehicle and a combustion engine, while isolating the other tank from both the engine and such one selected tank. The valve of the invention is adapted for use in closed loop systems wherein fuel supplied to the engine but not immediately consumed by it is reconveyed back to the tank from which it originated. The valve construction is such that it requires only a minimum number of fluid connections with the tanks and engine. Further, the valve, owing to its energization characteristics, lends itself to manual operation preferably through a conventional remote Bowden wire control. The construction of the valve, moreover, advantageously lends itself to mass production techniques and utilizes conventional materials and longproven principles to afford a satisfactory service life.

In the disclosed embodiment of the invention, the valve comprises a molded plastic housing defining a longitudinal bore and radially oriented ports communicating directly with the bore. Those ports associated with the fuel supply tanks are valved with spring-biased poppets. A rotary camshaft disposed in the bore selectively opens and closes appropriate ones of the poppets to establish fluid communication with one supply tank while isolating the other tank. The valve is advantageously arranged in such a manner that only limited rotation of the camshaft, for example 90 degrees, is required for shifting communication from one tank to the other. As a result, the valve is readily energized by a simple remotely controlled push-pull actuator.

The camshaft, in addition to its primary function of controlling operation of various port valves, divides the longitudinal housing bore into separate compartments each associated with one of the supply tanks. Leakage from each of the compartments, indicating a need for maintenance, is conveniently evidenced externally of the housing through a weep hole strategically disposed in the housing.

DESCRIPTION OF THE PREFERRED EMBODIMENT

Figure 1:
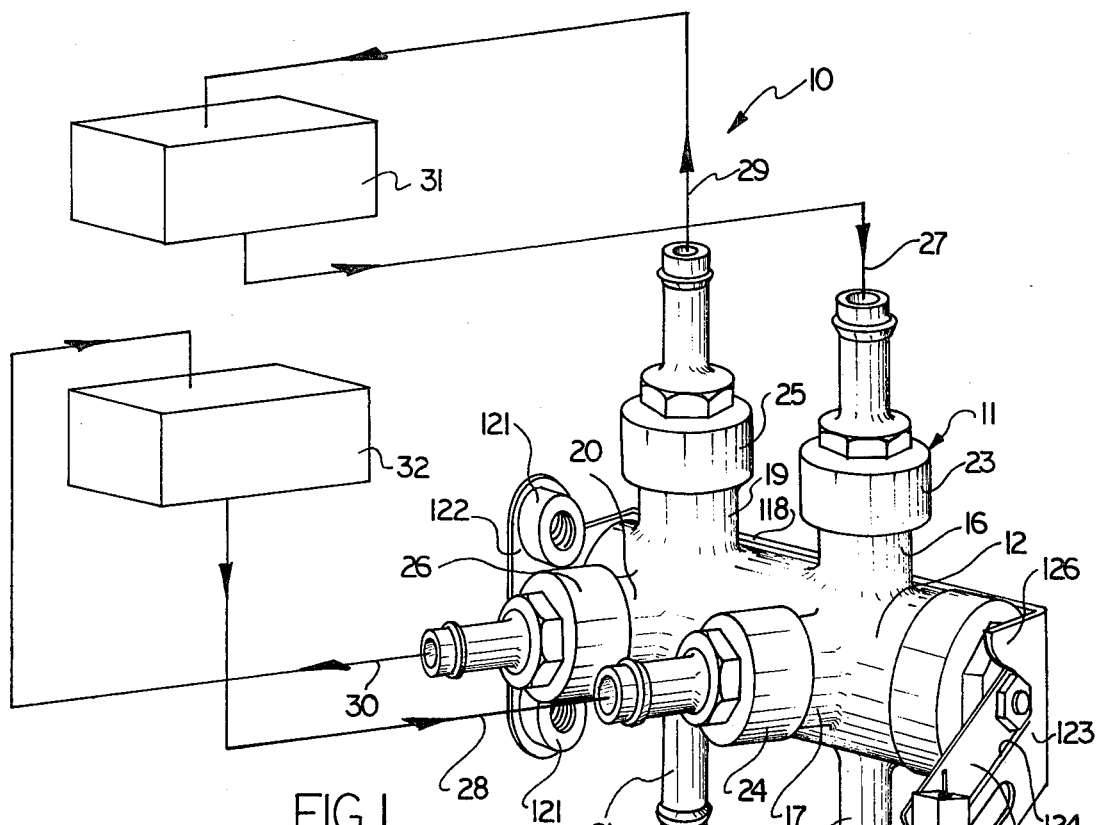
FIG. 1 is a perspective view of the control valve assembly of the invention and a diagrammatic circuit showing connections with a pair of supply tanks and provisions for connection with a combustion engine in a vehicle.

Referring now to the drawings, there is illustrated in FIG. 1 a fuel distribution circuit 10 for a combustion engine-driven vehicle. The circuit 10 includes a valve assembly 11 constructed in accordance with the invention. The valve assembly 11 includes a branched body 12 in which are housed various valving elements. Branches 16–21 forming the ports of the housing body 12 are radially disposed at separate stations or stages 13, 14 spaced longitudinally of the body. Certain of the branch ports 16, 17, 19, 20 are externally threaded for coupling with internally threaded connectors 23–26. These threaded and somewhat enlarged branch ports 16, 17, 19, 20 are connected by suitable lines diagrammatically indicated at 27–30 to two alternate fuel supply tanks 31, 32 storing liquid fuel such as gasoline, diesel oil, alcohol, or the like.

The housing body 12 is a generally cylindrical, thin-walled structure having a longitudinal bore 41 open at one end 42 and closed at an opposite end by an integral wall 43. The branch ports 16–18 and 19–21 at each stage 13, 14, respectively, are in a common plane transverse to the bore 41 and are three in number. Each port 16–21 generally has the form of a hollow, circular branch extending radially with respect to the longitudinal axis of the bore 41 and, with respect to each other at each stage, are in a T-like configuration. The construction of the ports at each stage 13, 14 is substantially the same. An adjacent pair of enlarged ports, i.e., the externally threaded ports 16, 17, and 19, 20, are angularly oriented relative to one another at a relatively small angle, e.g., in the illustrated case at 90 degrees.

The connectors 23–26 are hollow, generally circular elements having internal threads 47 adapted to mate with external threads of associated ones of the ports 16, 17, 19, 20. Outer ends of the connectors 23–26 are provided with external, circumferential barbs suitable for coupling with elastomeric hose forming at least portions of the lines 27–30. Each connector 23–26 includes an internal groove 51 for reception of an elastomeric O-ring 52 which seats on and seals the end face of its associated port 16, 17, 19, 20.

The enlarged branch ports 16, 17, 19, 20 are provided with central cylindrical bores 56 adjacent their juncture with the housing longitudinal bore 41 and somewhat larger counterbores 57 adjacent their outer free ends. An annular seat 58 extends generally radially to the axis of its associated port between the counterbore 57 and inner bore 56.

At each stage 13, 14 the relatively slender, hollow ports 18, 21 have integral circumferential barbs 64 for satisfactory coupling with elastomeric hoses forming at least part of lines schematically indicated at 66, 67 to and from a combustion engine of a motor vehicle.

Disposed in the longitudinal bore 41 is an elongated, generally circular valve operating camshaft 68. When assembled in the bore 41, the camshaft 68 includes a separate camming surface 69, 70 in longitudinal registration with each of the first and second port stages 13, 14.

Figure 3:
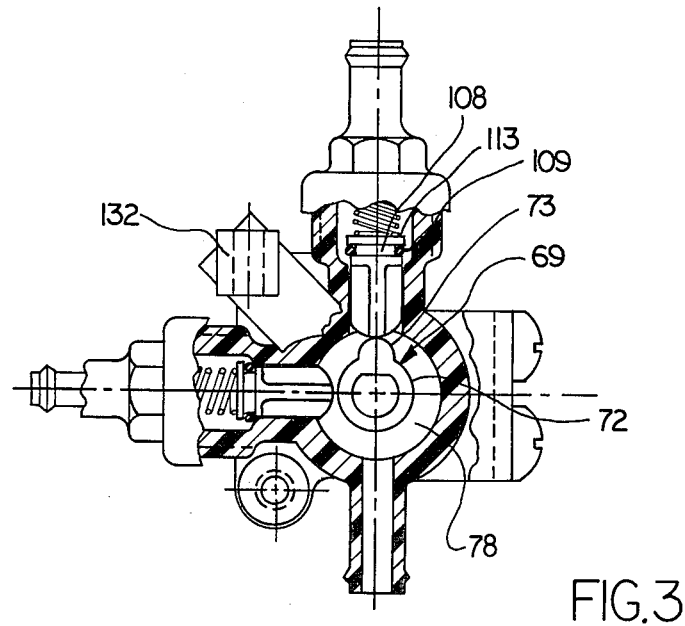
FIG. 3 is a cross-sectional view of the valve assembly taken in a plane transverse to its longitudinal axis at one valve stage and illustrating the valve elements at this stage in one selected position.
Figure 4:
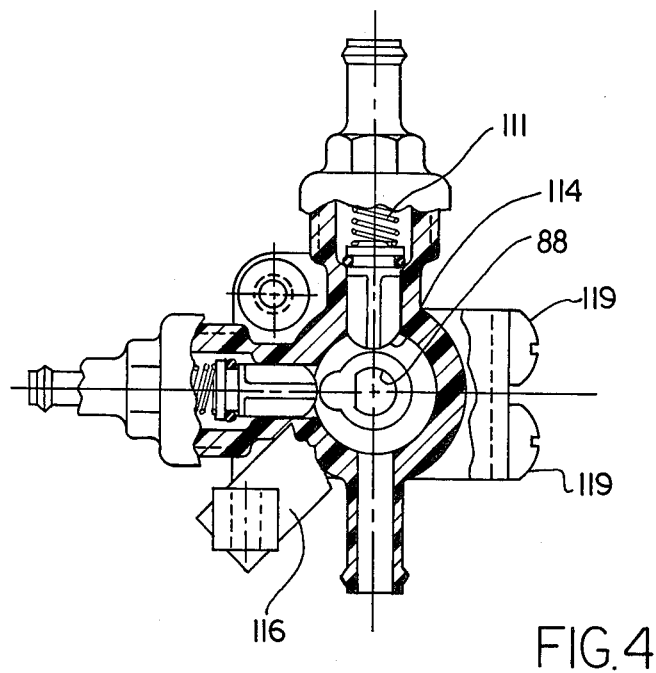
FIG. 4 is a cross-sectional view similar to FIG. 3 illustrating the valve elements in an alternate selected position.

With reference to FIGS. 3 and 4, the profile of the cam surface 69 at the first valve stage 13 includes a generally circular, no-life portion 72 concentric with the axis of the longitudinal bore 41 and a lift portion or lobe 73 of limited angular duration with respect to the circumference of the camshaft 68. The cam surface 70 at the second stage 14 is substantially identical and is in phase with the cam surface 69 of the first stage 13. The camshaft 68 includes a cylindrical section 76 axially intermediate the cam surfaces 69, 70. This camshaft section 76 forms the major diameter of the camshaft 68 and when in assembled position divides the longitudinal bore 41 into two longitudinally spaced compartments or chambers 78, 79. Axially spaced on the cylindrical section 76 are a pair of circumferential grooves 81 in which elastomeric O-rings are individually disposed to seal against the bore 41 and isolate the compartments 78, 79 from fluid communication therebetween. The camshaft 68 is rotatably journaled in the bore 41 with a suitable clearance fit therewith.

A unitary operating shaft 86 includes an acircular portion 87 which is assembled into a complementarily shaped bore 88 in an outer end of the camshaft 68. The operating shaft 86 also includes an intermediate cylindrical main body section 89 and a reduced diameter extension 90. An O-ring 91 is disposed in a circumferential groove on the shaft extension 90. The camshaft 68 and operating shaft 86 are retained in the bore 41 by an internally threaded cap 96 screwed onto complementary external threads on the open end 42 of the housing body 12. An O-ring 97 is disposed in a circumferential groove 98 inside the cap 96 and seals against an end face 99 of the body 12. The cap 96 includes a central aperture 101 through which the shaft extension 90 projects. The O-ring 91 seals against the cylindrical surface defining this aperture 101 to prevent escape of fluid from the compartment 78 along the shaft extension 90. A projection 102 on the inner end of the camshaft 68 cooperates with the operating shaft 86 and cap 96 to maintain axial registration of the cam surfaces 69, 70 with the radial bores 56 of the branch ports 16, 17 and 19, 20.

Figure 2:
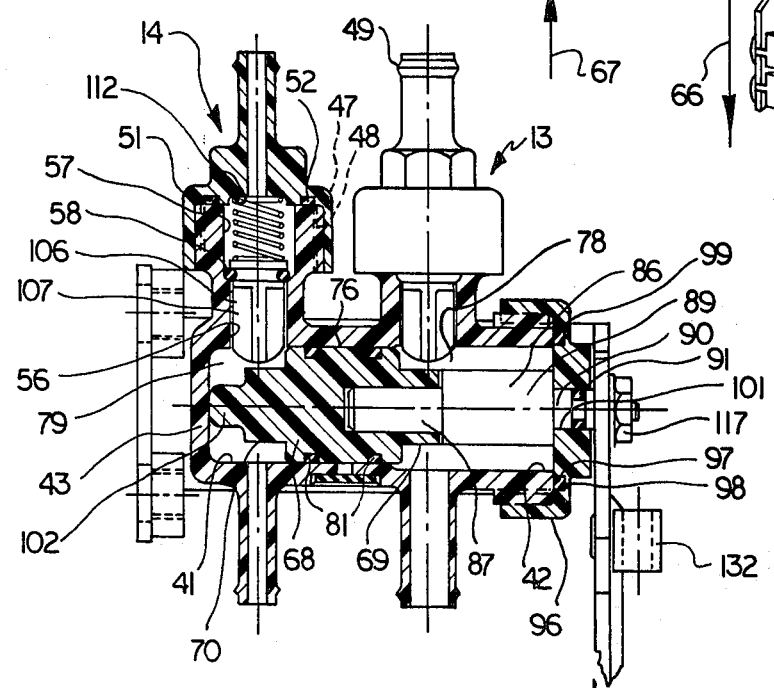
FIG. 2 is a cross-sectional view of the valve assembly taken in a plane along its longitudinal axis.

In each of the enlarged branch ports 16, 17 and 19, 20 there is disposed a poppet 106. Each poppet 106 is positioned in its respective bore 56, 57 before assembly of the removable connectors 23–26. An inward end 107 of each poppet 106 has a cross-like cross section dimensioned to slide freely in the bore 56. At its outward end a poppet 106 includes a circumferential groove 108 in which is disposed an elastomeric O-ring 109. The O-ring 109 is dimensioned to seal against the annular seat 58 at the base of the counterbore 57 when seated against this surface. A compression spring 111 is associated with each poppet 106. Each spring 111 is dimensioned such that it is at least slightly compressed between an inner face 112 of its associated connector 23–26 and an outward face 113 of the poppet 106 when the O-ring 109 is seated against the annular seat or shoulder 58. The compression spring 111 thereby resiliently biases the poppet 106 to its closed position. A lower end 114 of the poppet section 107 is rounded to permit movement of the camshaft 68 axially in and out of the bore 41 for assembly or inspection. During such movement, the rounded end 114 enables the poppet 106 to ride over, by moving radially in the bore 56, various surfaces of the camshaft 68. More specifically, as indicated in FIG. 2, the poppet 106 is dimensioned such that in its fully closed position the rounded end 114 presents an inclined surface to operate as a cam against any axially moving surfaces of the camshaft 68 during such assembly or disassembly.

Fixed to the operating shaft extension 90 is an operator arm 116 removably retained by a nut 117 threaded onto this extension. A U-shaped bracket 118 in the form of a sheet metal stamping is removably secured to the valve housing 12 by screws 119 threaded into the body (FIGS. 3 and 4). Internally threaded metal bosses 121 permanently fixed on one end leg 122 of the U-shaped bracket 118 are provided for purposes of mounting the assembly 11 to the vehicle in which it is installed. The other end leg 123 of the bracket 118 is disposed in the plane of the operator arm 116 and is bifurcated with a triangular slot 124 to permit pivotal movement of the arm about the axis of the shaft 86. Such movement of the arm 116 is limited in one direction by a stop 126 formed by a minor extension of the leg 123 and in the other direction by a major extension 127. At the free end of the major extension 127 a pair of clamps 128 secure the end of the sheath of a Bowden cable assembly 129. The core wire 131 of the assembly 129 is anchored in a block 132 pivotally fixed to the free end of the arm 116. The housing 12, connectors 23–26, camshaft 68, and poppets 106 are preferably formed by injection molding suitable thermoplastic resins such as Nylon or Delrin.

As indicated in FIG. 1, the ports 16–18 adjacent the open end of the bore 41, i.e., the ports at the stage 13, are dedicated to supplying fuel from the alternate supply tanks 31, 32 to the combustion engine through the line 66. More specifically, the connectors 23, 24 are connected to the tanks 31, 32 through the lines 27, 28 in a suitable manner, preferably to the bottom of these tanks 31, 32. In a closed fuel supply system such as disclosed there exists a circuit for returning unused fuel to the supply tanks 31, 32. The ports 19–21 at the closed end of the bore 41, i.e., those at the stage 14, are dedicated to this return flow service.

Fluid communication between one or the other of the large ports 16, 17, 19, 20, with the smaller ports 17, 21 at the corresponding stages 12, 13, is selected by operation of the shaft 86 and camshaft 68. The shaft 86 is operated from a point remote from the location of the valve assembly 11, for example, from the passenger compartment of the vehicle, manually by push-pull operation of the cable assembly 129 in a known manner which causes oscillation of the arm 116 and corresponding rotation of the shaft 86 and camshaft 68.

By rotating the cam lobes 73 at each station 13, 14 into registration with the center of the port bores 56, the cam surfaces 69, 70 are caused to lift the associated poppets 106 against the springs 111 and cause their O-rings 109 to move away from engagement with their respective port seats 58. This operation is illustrated in a comparison of FIGS. 3 and 4. With the cam surface 69 lifting a particular poppet 106, flow can be established around the X cross section 107 of the poppet through the bores 56, 57 and through the nonvalved smaller port 18, 21 or, in the case of the return flow stage 14, in the opposite order.

In one extreme angular position of the arm 116, the camshaft 68 is caused to open one set or bank of poppets 106, i.e., the poppets which are in angular alignment to one another. In the other extreme angular position, since the cam lobes 73 are in phase, the other bank of poppets 106 is forced open while the first set is closed.

From the foregoing disclosure, it will be understood that the valve assembly 11 is adapted to feed from a particular tank 31 or 32 and return any unused fuel to that tank while maintaining the other tank completely isolated from both feed and return lines 66, 67. When one tank 31 or 32 is depleted, the cable 131 is operated to rotate the camshaft 68 90 degrees. The previously open first set of poppets 106 is closed and the other is opened by the cams 69, 70. The 90-degree relationship of each set of radial valve ports at each stage 13, 14 permits a mechanically simplified operation of the valve through a relatively limited angular swing of the arm 116, with the simplicity of the push-pull cable assembly 129. The profile of the cam lobes 73 is of a limited arcuate extent on the circumference of the camshaft 68 with respect to the 90-degree spacing of the banks of ports so that there is no overlap in the opening of the poppets 106 during the shift between opening of one bank to the opening of the other. That is, before the poppets of a new bank are opened, the poppets of the previously open bank are closed. The spring-biased poppets 106 operate in the manner of check valves when not influenced by the cam lobes 73 so that flow from the tanks 31, 32 is checked but excess pressure in the housing allows return flow to the tanks.

Although the preferred embodiment of this invention has been shown and described, it should be understood that various modifications and rearrangements of the parts may be resorted to without departing from the scope of the invention as disclosed and claimed herein.

What is claimed is:

1. A valve for selectively connecting one of a pair of alternate fuel supply tanks with a common supply line to and a common return line from a combustion engine, said valve including a housing having a first chamber dedicated to supply fuel from said tanks to said engine and a second chamber dedicated to return unused fuel from said engine to said tanks, actuator shaft means shiftable on an axis between first and second positions, at each chamber first and second tank connecting ports and an engine connecting port, valving means disposed in said chambers, said valving means being radially oriented with respect to said shaft axis, said valving means being responsive to positioning of said shaft in its first position to establish supply flow from a first of said tanks through said first chamber to said engine and return flow from said engine through said second chamber to said first tank while isolating said second tank from supply and return flow connection with said engine, said valving means being responsive to positioning of said shaft in its second position to establish supply flow from a second of said tanks through said first chamber to said engine and return flow from said engine through said second chamber to said second tank while isolating said first tank from supply and return flow communication with said engine.

2. A valve as set forth in claim 1, wherein said valving means includes a poppet valve element associated with each of said tank connecting ports, said shaft including cam means to effect selective operation of said poppets.

3. A valve as set forth in claim 2, wherein said operating shaft is journaled for rotation on said housing.

4. A valve as set forth in claim 3, wherein said cam means is arranged to preclude simultaneous opening of supply poppets at said first chamber and simultaneous opening of return poppets at said second chamber.

5. A valve as set forth in claim 4, including spring means biasing said poppets to closed positions, said poppets being arranged to operate as check valves normally preventing flow from their respective tanks.

6. A valve as set forth in claim 5, wherein said first and second chambers share a common bore in said housing.

7. A valve as set forth in claim 6, wherein said shaft is rotatably journaled in said bore.

8. A valve as set forth in claim 7, wherein said shaft is arranged to form the principal body separating said first and second chambers in said bore.

9. A valve as set forth in claim 8, wherein said housing bore includes an area intermediate said first and second chambers, said intermediate area including a weep port venting said bore to the exterior of said housing.

10. A valve as set forth in claim 8, wherein poppet-valved supply ports in said first chamber and poppet-valved return ports in said second chamber are oriented relative to one another in a plane perpendicular to the axis of shaft movement at an angle substantially less than 180 degrees whereby said shaft is capable of controlling said poppets with a rotational movement substantially less than 180 degrees.

11. A valve for a dual tank fuel supply system in a combustion engine-driven vehicle, said valve comprising a housing having a longitudinal bore, said housing including a plurality of ports arranged at first and second stages spaced along the length of said bore, the ports at said first stage including separate supply ports for receiving fuel from an associated one of said tanks and a supply port for feeding fuel to said engine, the ports at said second stage including separate return ports for returning unused fuel to an associated one of said tanks and a return port for receiving unused fuel from said engine, said tank-associated ports at each stage being arranged to communicate with the respective engine-related port through a chamber formed by said bore, said tank-associated ports each including a poppet valve, spring biasing means biasing each of said poppets to a closed position wherein fluid communication with the associated tank is prevented, said poppets being radially oriented with respect to the axis of said bore, an actuating shaft disposed in said bore and rotatable about the axis of said bore between first and second angularly spaced positions, said shaft including cam means to selectively radially open said poppets against said spring biasing means, said cam means being constructed and arranged in said first position at said first stage to open the supply poppet associated with a first of said tanks while allowing the supply poppet associated with a second of said tanks to remain closed and at said second stage to open the return poppet associated with said first of said tanks while allowing the return poppet associated with said second of said tanks to remain closed and in said second position at said first stage to open the supply poppet associated with the second of said tanks while allowing the supply poppet associated with the first of said tanks to remain closed and at said second stage to open the return poppet associated with the second of said tanks while allowing the return poppet associated with the first of said tanks to remain closed.

* * * * *